United States Patent [19]

Kanda et al.

[11] Patent Number: 4,930,024
[45] Date of Patent: May 29, 1990

[54] VARIABLE SPEED MAGNETIC MEDIUM RECORDING AND PLAYBACK APPARATUS

[75] Inventors: Shuhei Kanda; Mitugu Hirota; Teruo Narushima, all of Fukaya, Japan

[73] Assignee: Kabushiki Kaisha Toshiba, Kanagawa, Japan

[21] Appl. No.: 29,820

[22] Filed: Mar. 25, 1987

[30] Foreign Application Priority Data

Mar. 26, 1986 [JP] Japan ................................ 61-65862
Mar. 26, 1986 [JP] Japan ................................ 61-65863

[51] Int. Cl.$^5$ .......................................... H04N 5/783
[52] U.S. Cl. ................................ 360/10.1; 360/10.3; 360/70; 360/75; 358/335
[58] Field of Search ............................ 360/10.1–10.3, 360/70, 75–77, 23, 77.01, 77.12, 77.13, 77.16; 358/310, 335, 336

[56] References Cited

U.S. PATENT DOCUMENTS

| | | | |
|---|---|---|---|
| 3,869,709 | 3/1975 | Yamagishi et al. | 360/10.3 |
| 4,139,867 | 2/1979 | Foerster | 360/10.3 |
| 4,167,023 | 9/1979 | Bessette et al. | 360/70 X |
| 4,263,623 | 4/1981 | Woo et al. | 360/10.3 |
| 4,339,775 | 7/1982 | Lemke et al. | 360/10.3 |
| 4,463,390 | 7/1984 | Koga et al. | 360/10.3 |
| 4,531,162 | 7/1985 | Tokumitsu | 360/10.3 |
| 4,583,131 | 4/1986 | Dakin | 360/10.1 X |
| 4,597,019 | 6/1986 | Nishimoto et al. | 360/23 X |
| 4,626,936 | 12/1986 | Yoshino | 360/70 |
| 4,636,874 | 1/1987 | Hoogendoorn et al. | 360/10.3 X |
| 4,656,537 | 4/1987 | Toba et al. | 360/10.3 X |
| 4,680,658 | 7/1987 | Tatami | 358/336 X |
| 4,733,312 | 3/1988 | Morimoto | 360/10.1 |

FOREIGN PATENT DOCUMENTS

| | | |
|---|---|---|
| 0176257 | 4/1986 | European Pat. Off. |
| 1312853 | 4/1973 | United Kingdom . |
| 1418545 | 12/1975 | United Kingdom . |
| 2002946 | 2/1979 | United Kingdom . |
| 2036407 | 6/1980 | United Kingdom . |
| 2058433 | 4/1981 | United Kingdom . |
| 2083314 | 3/1982 | United Kingdom . |

OTHER PUBLICATIONS

Japanese Periodical, "Television Technology," published by Electronic Technology Publishing, Inc., pp. 35–59, Nov. 1985.

*Primary Examiner*—Alan Faber
*Assistant Examiner*—W. R. Young
*Attorney, Agent, or Firm*—Finnegan, Henderson, Farabow, Garrett, and Dunner

[57] ABSTRACT

A variable speed magnetic medium recording and playback apparatus for reproducing signals prerecorded in defined tracks on a magnetic recording medium by cyclical helical scanning and generating an output video signal subject to noise when more than one track is scanned in a single cycle. The magnetic reproducing apparatus includes a variable speed rotary head for helically scanning the prerecorded signals on the recording medium, a variable speed drive device or a capstan device for moving the recording medium in relation to the rotary head, and a circuit for controlling the speed of the rotary head in correspondence with changes in the speed of the variable speed drive device for reducing noise in the output signal of the apparatus.

12 Claims, 11 Drawing Sheets

VARIABLE SPEED MAGNETIC MEDIUM RECORDING AND PLAYBACK APPARATUS

BACKGROUND OF THE INVENTION

1. Field of the Invention

The present invention relates to a variable speed magnetic medium recording and playback apparatus and, more particularly, to a variable speed magnetic reproducing apparatus.

2. Description of the Prior Art

In the field of magnetic reproducing apparatus such as a home video tape recorder (referred as VTR hereafter), an apparatus has been developed for performing a specific speed playback such as a fast playback, a still image playback, and a slow playback. In such apparatus, two rotary magnetic heads with different azimuth angles are used to alternately record or play back composite video signals of one field period. Video tracks with different azimuth angles are alternately formed on a magnetic tape, track each being aligned in the helical direction to the magnetic tape. The recorded video signals of one field period are alternately played back. For this reason, if video signals are played back while the magnetic tape is driven at a speed different from a speed in the recording mode, some video tracks can be traced over their entire length by one head with an appropriate azimuth angle. However, the other tracks often fail to be traced over their entire lengths by the head with the appropriate azimuth angle, or the other tracks may be traced by the other head with a different azimuth angle. As a result, levels of the playback signals from the other tracks are greatly reduced, thus causing noise on the screen corresponding to the other tracks.

Accordingly, a VTR including a specific speed, e.g., fast, still and/or slow, playback apparatus with a memory has also been developed. In this apparatus, only a composite video signal of one field, the record track, which is traced over its entire length by the head with the appropriate azimuth angle, is selected. Thus, the selected composite video signal, i.e., the selected field signal, has a sufficient level and is almost completely free from noise.

The selected field signal is converted to digital data by an A/D (analog to digital) conversion and the digital data is written (or stored) in the memory. The stored digital data is then read out from the memory and restored to the original composite video signal of an analog signal by a D/A (digital to analog) conversion to obtain a specific speed playback image on the screen of a video display device, which is almost free from noise. The VTR including the specific speed playback apparatus with such a memory uses neither extra heads nor any other means for intermittently driving the magnetic tape, and allows a simple arrangement for the specific speed playback. Such a VTR including the specific speed playback apparatus is, for example, disclosed by the Japanese Periodical "Television Technology", November 1985, published by Electronic Technology Publishing Inc.

However, when performing an extremely fast or slow playback at a speed of, for example, six times or 1/6 times the normal tape speed, the magnetic rotary heads inevitably scan across two or more of the record tracks so noise inevitably arises when the one azimuth magnetic rotary head scans the record tracks recorded by the other azimuth magnetic rotary head.

Figure 15:
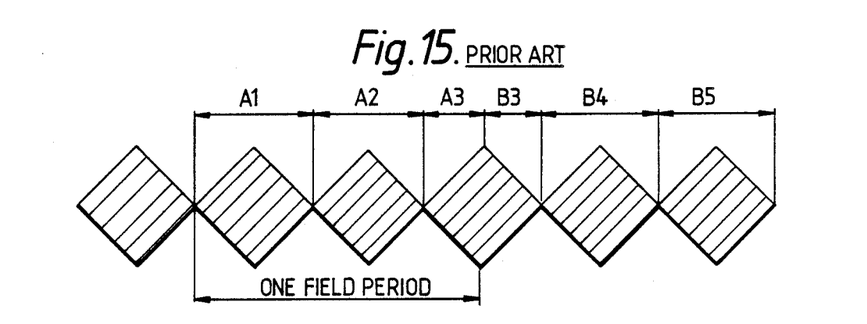
FIG. 15 is a graph showing the envelope of the playback signals obtained by a conventional VTR during reverse playback at a speed six times greater than normal playback mode.

For example, considering a fast picture search at a speed of six times the normal tape running speed, the rotation speed of a rotary disc is controlled so that the horizontal synchronous signal of the playback video signals has a normal frequency. Also, the capstan servo system is controlled so that the phase of the playback control signal is locked at six times the rotary disc rotation speed. Therefore, the envelope of the playback video signals becomes one, as shown in FIG. 15, and a noise burr inevitably arises at the reduced level portions of the envelope. Accordingly, a specific speed playback image with less noise cannot be obtained with the apparatus described above.

SUMMARY OF THE INVENTION

Accordingly, an object of the present invention is to provide a magnetic reproducing apparatus capable of variable speed playback.

Another object of the present invention is to provide a magnetic reproducing apparatus which is designed so that limitations of conventional apparatus such as those described above can be overcome.

Still another object of the present invention is to provide a magnetic reproducing apparatus in which a specific speed playback image with reduced noise can be obtained.

In order to achieve the above objects, the magnetic reproducing apparatus includes a variable speed rotary head for helically scanning prerecorded signals on a magnetic recording medium, a variable speed drive device or a capstan device for moving the recording medium in relation to the rotary head, and a circuit for controlling the speed of the rotary head in correspondence with changes in the speed of the variable speed drive device for reducing noise in the output signal of the apparatus.

In accordance with another aspect of the invention, the magnetic reproducing apparatus according to the present invention includes a rotation control circuit for controlling the rotation speed of a rotary disc provided with heads in the same or the reverse direction relative to that of normal playback at a speed of a constant, a, ($a \neq 1$) times the ($a \neq 1$) of normal playback speed and for controlling the rotation speed of a capstan motor for running a magnetic tape in the same or reverse direction relative to that of the normal playback at a speed of a constant, b, ($b \neq 1$) times the normal playback speed; a sampling circuit for sampling a composite video signal played back from the heads by a sampling signal of a specified frequency associated with the rotation speed of the rotary disc; an A/D converter for converting the sampled level of the composite video signal; a memory device for storing the digital composite video data; and a reading means for reading the stored digital composite video data in the direction the same as that used during sampling in time relation at a frequency of 1/a times the frequency of the sampling signal and outputting it as an original composite video signal of an analog form.

At a specific speed playback mode other than the normal playback mode, the magnetic tape runs at the speed of b times the speed of the normal playback mode and the rotary disc is rotated in the same or the reverse direction at the speed of a times the normal playback mode speed. As a result, the relative angle between the scanning locus of a magnetic rotary head and the gradient of tracks becomes smaller than that obtained when the magnetic tape runs at the speed of b times, and noise is reduced. For example, when $a = b$, the scanning locus of the magnetic rotary head and the gradient of tracks are the same as those in the normal playback mode so that a playback signal with less noise can be obtained. Also, even when $a \neq b$, the relative angle between the scanning locus and the gradient of tracks becomes smaller. Therefore, when a and b are set in a specific relation, the position of the noise in one field period can be fixed so that the noise burr is removed from the image on the screen or shifted to an invisible zone of the screen using memory means.

DESCRIPTION OF THE PREFERRED EMBODIMENTS

The present invention will now be described in detail with reference to the accompanying drawings, namely, FIGS. 1 to 14. Throughout the drawings, like reference numerals and letters are used to designate like or equivalent elements for the sake of simplicity of explanation.

Figure 1A:
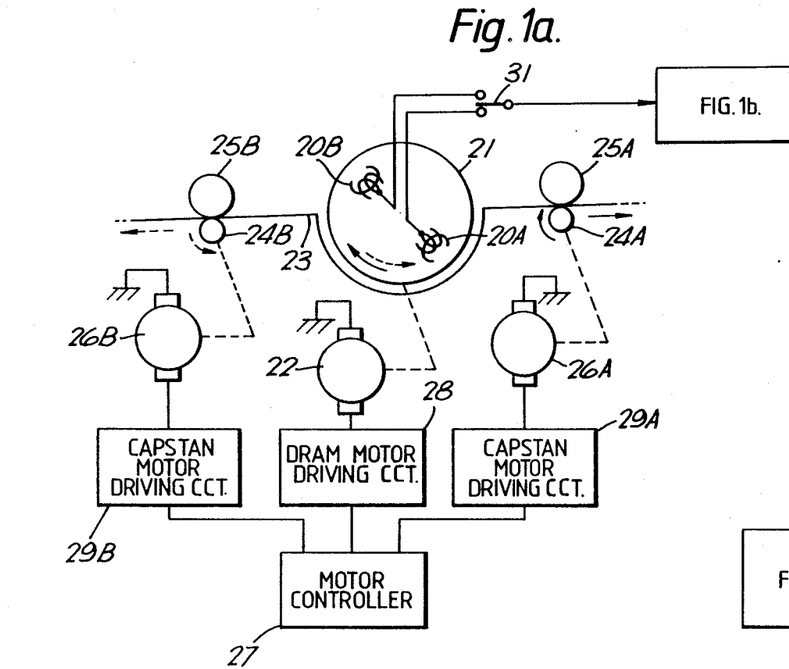
FIGS. 1a and 1b together are a block diagram showing an embodiment of the magnetic reproducing apparatus according to the present invention which is capable of variable speed playback.
Figure 1B:
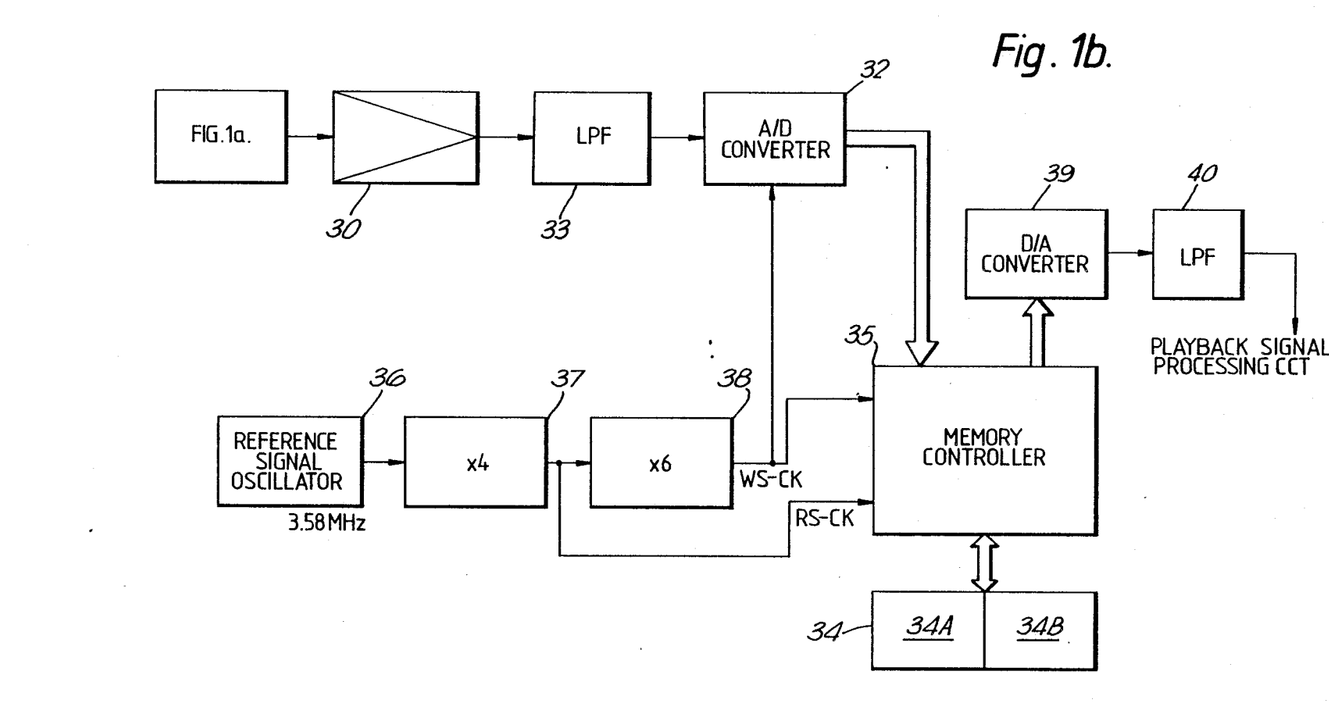

Referring now to FIGS. 1 to 5, an embodiment of a VTR including a variable speed playback apparatus according to the present invention will be described in detail. FIG. 1 shows a block diagram of an embodiment of the magnetic reproducing apparatus which includes specific speed playback apparatus for VTRs. The apparatus is constructed so that it is possible to perform a fast forward playback at a speed of six times the normal playback speed. In the drawing, two magnetic rotary heads 20A, 20B are mounted on a rotary disc 21 to have a relative angle 180° therebetween. The rotary heads 20A, 20B have different azimuth angles from each other. The rotary disc 21 is driven to rotate by a dram motor 22. A magnetic tape 23, which is in slidable contact with the rotary disc 21, travels in a forward direction (see the arrow with the solid line) by a forward drive capstan 24A and a pinch roller 25A or in a reverse direction (see the arrow with the broken line) by a reverse drive capstan 24B and a pinch roller 25B. The forward drive capstan 24A and the reverse drive capstan 24B are driven by a forward drive capstan motor 26A and a reverse drive capstan motor 26B, respectively. The rotation speeds and rotation directions of the dram motor 22 and the capstan motors 26A, 26B (forward rotation dierection shown by the arrow with the solid line, reverse rotation direction shown by the arrow with the broken line) are controlled by a motor controller 27 through a dram motor drive circuit 28 and capstan motor drive circuits 29A and 29B, respectively.

The head selector switch 31 alternately connects playback video signals outputted from the rotary heads 20A, 20B to the video signal amplifier 30 under the control of a predetermined head switch signal so that the playback video signals are connected together and applied to the video signal amplifier 30 as a continuous video signal. The playback video signal amplified by the video signal amplifier 30 is applied to an analog to digital converter (A/D converter) 32 through a low pass filter 33. The A/D converter 32 samples the playback video signal in synchronization with a predetermined sampling clock WS-CK which will be described below, and converts the sampled value of the video signal to digital data. The digitized video data is written or stored into a field memory 34 through a memory controller 35. An oscillator 36 is provided for generating a reference clock signal CK of, for example, 3.58 MHz. The reference clock signal CK is multiplied by a four time multiplier 37 so that a read sampling clock RS-CK, of 14.32 MHz, i.e., 4×Ck is produced. The read sampling clock RS CK is applied to a read clock input terminal of the memory controller 35. The read sampling clock RS-CK is further multiplied by a six-time multiplier 38 so that the predetermined sampling clock WS-CK of 86.92 MHz, i.e., 6×RS-CK, is produced as a write sampling clock. The write sampling clock WS-CK is applied to a write clock input terminal of the memory controller 35. The write sampling clock WS-CK is further applied to a clock input terminal of the A/D converter 32 as described above. Accordingly, the video signal applied from the low-pass filter 33 is sampled at a cycle of the frequency of the write sampling clock WS-CK.

The memory controller 35 controls the writing of the digitized video data outputted from the A/D converter 32 to the field memory 34 in synchronization with the write sampling clock WS-CK. The memory controller 35 also controls the reading of the digitized video data stored in the field memory 34 in synchronization with the read sampling clock RS CK. The digitized video data read out from the field memory 34 is applied to a digital to analog converter (D/A converter) 39 so that the digitized video data is converted to an analog video signal. As a result, the digitized video data is restored to the analog video signal equivalent to the original video signal on the input terminal of the A/D converter 32. The video signal thus restored by the D/A converter 39 is outputted through a low-pass filter 40 and applied to a playback signal processing circuit (not shown in the drawing). The low pass filter 40 removes frequency components of more than ½ times the frequency of the read sampling clock RS-CK, which is contained in the output signal of the D/A converter 39.

Figure 2:
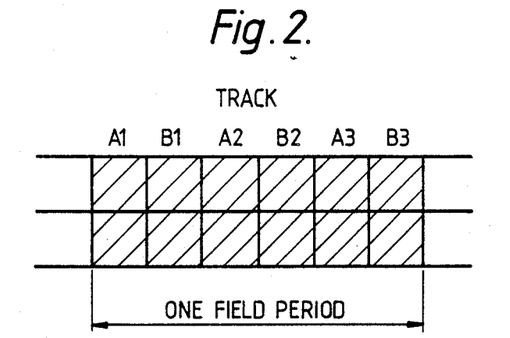
FIG. 2 is a graph showing a wave form of playback signals obtained when the rotation speed of a rotary disc and the running speed of a magnetic tape are made six times greater than the normal playback mode.

A fast forward playback operation at the speed six times the normal playback speed will now be described. When the rotary disc 21 and the forward drive capstan 24A are rotated in their forward directions by the motor controller 27 at the speeds of six times their respective normal playback speed ($a=b=6$), the magnetic rotary heads 20A, 20B securely trace the record tracks on the magnetic tape 23 in the same direction as that of the normal playback mode. As shown in FIG. 2, the envelope of the playback composite video signal changes to a frequency of six times the frequency in the normal speed playback mode, while the amplitude remains constant.

Figure 3:
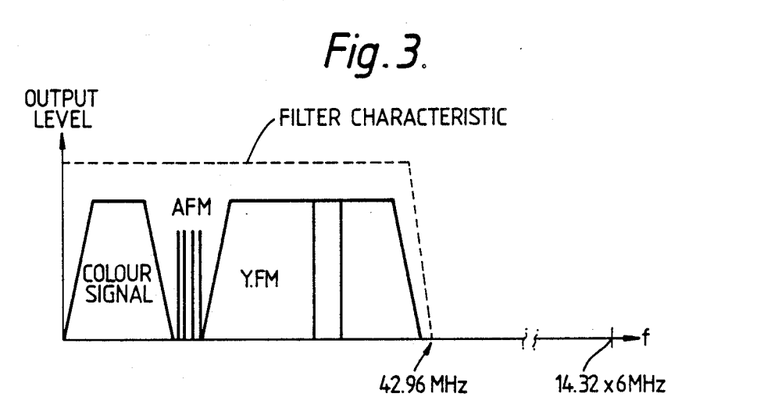
FIG. 3 is a level diagram showing the relationship between the composite video signal and the filter characteristic of the low-pass filter 33 in the embodiment of FIG. 1.

Accordingly, as shown in FIG. 3, the luminance signal Y in the playback composite video signal becomes 30 MHz, i.e., six times the frequency 5 MHz in the normal playback mode. The low range frequency conversion color signal in the playback composite video signal also becomes 4.2 MHz ($=6\times700$ kHz), and the audio FM (frequency modulation) signal in the playback composite video signal becomes 9.0 MHz ($=6\times1.5$ MHz). Further, as the read sampling clock RS-CK is 14.32 MHz and the speed rate of the playback is six times the normal playback speed, a filter characteristic of 42.96 MHz cut-off frequency is used for the low-pass filter 33, as shown in FIG. 3.

In the structure described above, the composite video signals played back from the magnetic rotary heads 20A, 20B have a frequency of six times that of the normal playback. These signals are amplified in the playback video signal amplifier 30, and then only frequency components of less than 42.96 MHz are removed by the low-pass filter 33. The resulting signal is applied to the A/D converter 32. The composite video signal is sampled by the sampling clock WS-CK of 85.92 MHz in the A/D converter 32 and converted at each sample time to digital composite video data corresponding to the amplitude value of the analog composite video signal applied from the low-pass filter 33. Then, the digital data are sequentially written in the memory 34 under the control of the memory controller 35.

Figure 4:
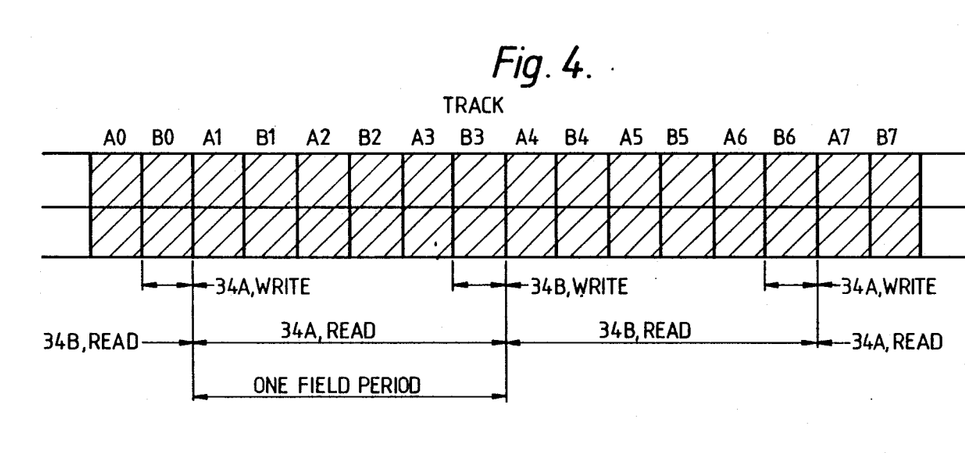
FIG. 4 is a diagram showing the read/write timing of the memory in the embodiment of FIG. 1.

Referring now to FIG. 4, the timing diagram of the writing and reading operation for the field memory 34 will be described. In FIG. 4, the composite video signals obtained by the rotary head 20A from record tracks A0, A1, A2, ... A8 and the composite video signals obtained by the rotary head 20B from the record tracks B0, B1, B2, ... B8, in which the composite video signals for six fields are read during one field time, are digitized and sequentially stored in the memory 34 in order of the tracks of A0, B1, A1, B2 ... A7, and B8. The memory controller 35 performs the operation of writing the digital composite video data in the memory 34 as described above. Also, the memory controller 35 performs the operation of reading the digital composite video data stored in the memory 34 at the cycle of the read sampling clock RS-CK in the order opposite the order in the writing mode, and applies the data to the D/A converter 39. The digital data thus read is converted into the original analog composite video signals in the D/A converter 39 as described above.

As described above, if the field memory 34 has the memory capacity M of $1\text{ bit}\times256\text{K}\times6$, the field memory 34 at can store at least the digital composite video data for one field. However, the digital composite video data obtained from the rotary heads 20A and 20B are alternately written in two memory elements 34A and 34B each having the memory capacity of $1\text{ bit}\times256\text{K}\times6$. When the writing operation to the memory element 34A is performed, the reading operation of the memory element 34B also is performed. As a result, the digital composite video data for six fields is continuously read from one memory element 34A or 34B and the specific speed playback image can be played back without interruption.

In the fast forward playback operation, the composite video signal reproduced from the magnetic rotary heads 20A and 20B is converted to a voltage corresponding to the instantaneous frequency at the time of demodulation of the FM wave, and a demodulation output with the phase the same as the normal playback mode can be obtained. Also, the color signal C is demodulated by locking the phase of a burst signal to a prescribed reference signal fsc, and a demodulated output can be obtained in the normal playback mode except hen the phase difference with respect to the burst signal is constant.

Now, a fast reverse playback operation at the speed six times the normal playback speed will be described. When the rotary disc 21 and the reverse drive capstan 24B are rotated in their forward directions by the motor controller 27 at the speeds of six times their respective normal playback speed ($a=b=6$), the magnetic rotary heads 20A, 20B securely trace the record tracks on the magnetic tape 23 in the reverse direction relative to that of the normal playback mode. As shown in FIG. 2, the envelope of the playback composite video signal changes to a frequency of six times the frequency in the normal speed playback mode, while the amplitude remains constant, similar to the fast forward playback operation described above.

Figure 5:
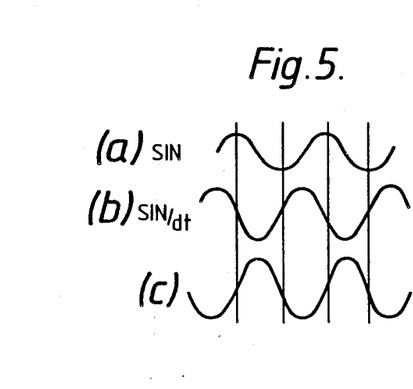
FIGS. 5a through 5c show relationships between wave forms of a recorded signal, a forward playback signal and a reverse playback signal.

In reverse playback, however, the image portion corresponding to the lower portion of the screen is first played back and the time axis is inverted to the image in the normal playback operation. For example, when a signal SIN with a sine wave, as shown in FIG. 5($a$), is recorded, the normal direction playback output is proportional to the differentiation wave of the record signal SIN, i.e., SIN/dt, as shown in FIG. 5($b$), While time axis and polarity of the reverse playback output are inverted from the normal direction playback output, as shown in FIG. 5($c$). Therefore, the memory controller 35 reads the digital composite video data stored in the memory 34 at the cycle of the reading mode sampling clock RS-CK in the order reverse to the order in the writing mode, and applies the data to the D/A converter 39 so that the time axis of the playback video signal is restored to the normal time axis in the recorded signal.

In the operations of both fast forward and reverse playbacks at the speed of six times the speed of the normal playback, the luminance signal Y in the playback composite video signal becomes 30 MHz, i.e., six times the frequency of 5 MHz in the normal playback mode, similar to the fast forward playback operation as described above. The low range frequency conversion color signal in the playback composite video signal also becomes 4.2 MHz (=6×700 kHz), and the audio FM (frequency modulation) signal in the playback composite video signal becomes 9.0 MHz (=6×1.5 MHz).

Figure 6:
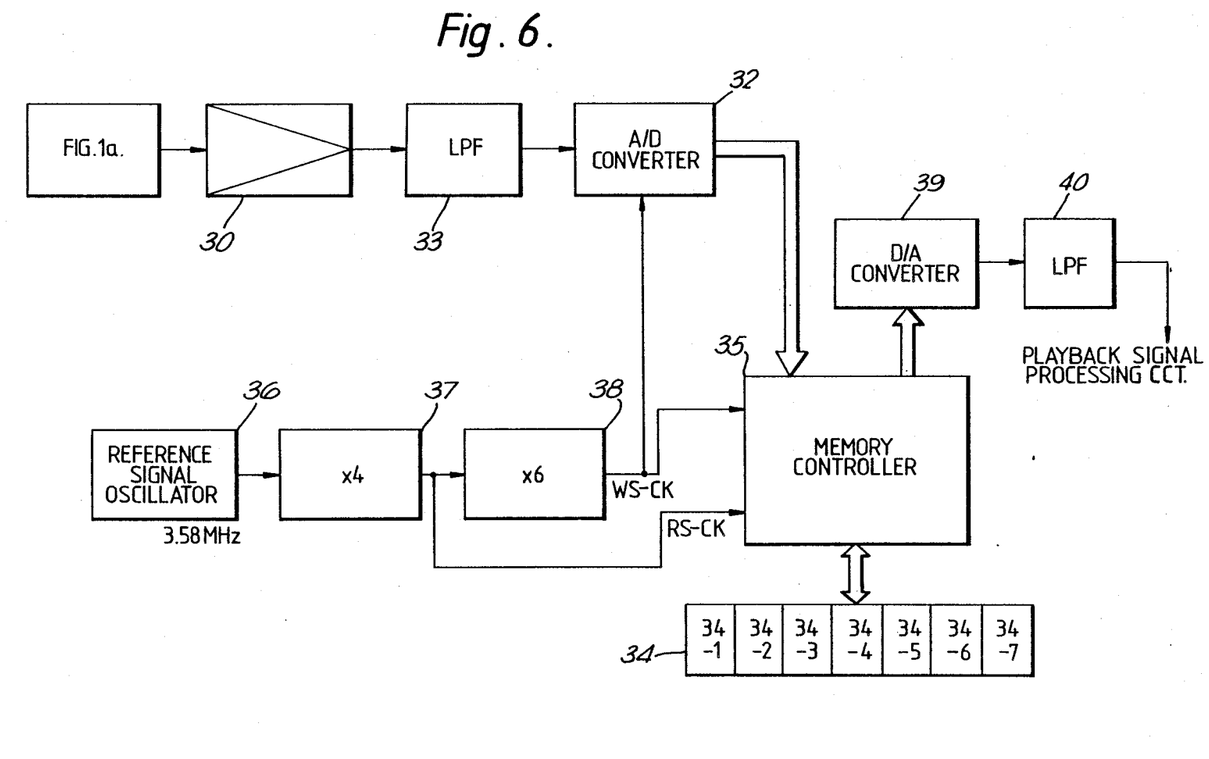
FIG. 6 is a block diagram showing another embodiment of the present invention.

Referring now to FIG. 6, a block diagram of another embodiment of a VTR including the specific speed playback apparatus according to the present invention is shown. The only difference from the embodiment shown in FIG. 1 is that the field memory 34 comprises seven memory elements 34-1, 34-2, ... 34-7, each having a memory capacity corresponding to 1/6 of a field. In particular, an extra memory element for storing the digital composite video data corresponding to 1/6 of a field on the screen is provided in addition to a field memory having a memory capacity corresponding to one entire field. As shown in the read/write timing diagram of FIG. 7, digital video composite data is written in the memory 34 for one field, and the stored data for 1/6 of a field simultaneously is read. The reading operation is carried out from other five of the memory elements, and continuous playback may be performed.

Figure 7:
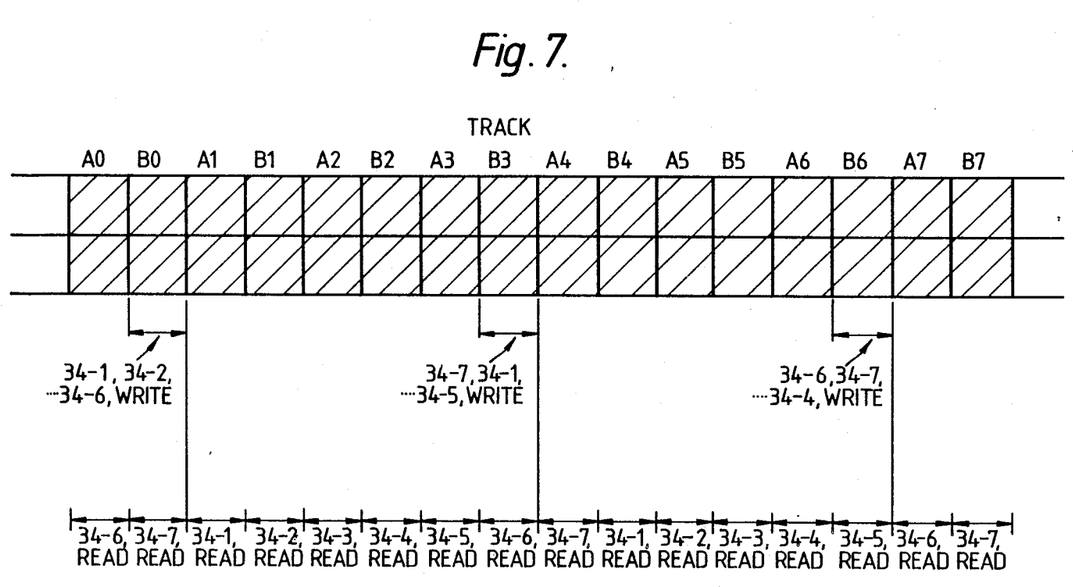
FIG. 7 is a graph showing the read/write timing of the memory in the embodiment of FIG. 6.

For example, when a reverse playback is carried out, the playback output of the track B1 is sampled at the frequency of the write sampling clock WS-CK, i.e., six times that of the read sampling clock RS-CK, in the order of the memory elements 34-1, 34-2, 34-3, 34-4, 34-5, 34-6, during 1/6 of the field period, and is written for one field. The stored data of the memory element 34 7 is read out at the cycle of the read sampling clock RS-CK in the reverse direction relative to that of writing during the writing period of the data corresponding to the playback output of &he track B1. After that, the digital playback video data are read out at the cycle of the read sampling clock RS-CK in the order of the memory elements 34-5, 34-4, ... 34-2 so that 5/6 of the one field image is demodulated. Next, when the track B4 is played back, the data of the one field are written at the cycle of the write sampling clock WS-CK, i.e., six times the read mode sampling clock RS-CK. Simultaneously, the stored data are read at the cycle of the read sampling clock RS-CK in the reverse direction relative to that of storing and demodulating. When such an operation is circularly performed, a continuous video signal is demodulated.

Figure 8:
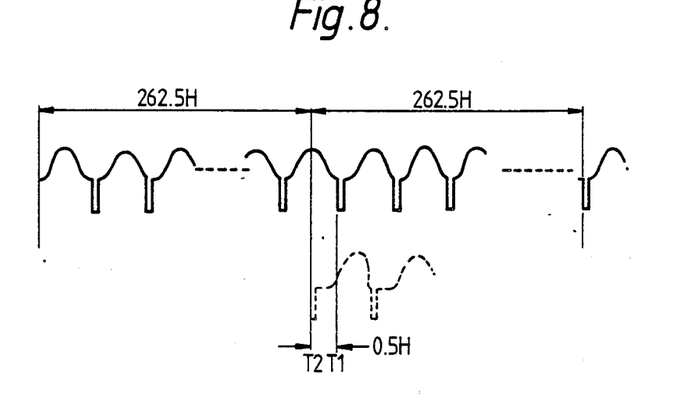
FIG. 8 is a graph for explaining the method of correcting a skew in the embodiments of FIG. 1 and FIG. 6.

In the embodiments of FIG. 1 and FIG. 6, the composite video signals played back by one azimuth angle head are intermittently written. Therefore, the playback video image on the screen is skewed at the changeover position of the even and odd fields for ½ of a horizontal scanning period. However, as shown in FIG. 8, the skew can be avoided by changing the write timing from the timing T1 to an alternative timing T2, so that the write timing is shifted for the ½ horizontal scanning period H. The skew can also be avoided by writing the playback signal in the order of alternating the tracks A and B, for example, the order of B1, A4, B7.

Figure 9:
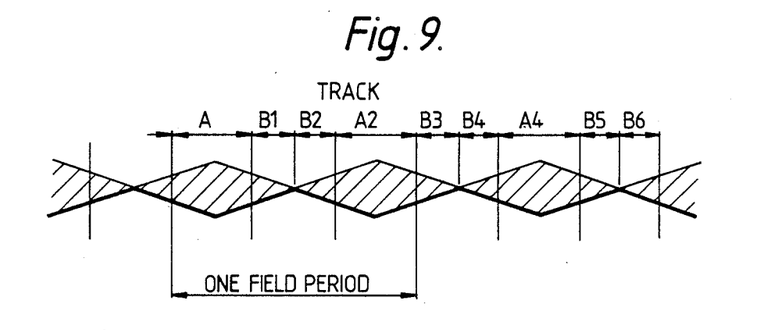
FIG. 9 is a graph showing the envelope of the playback signals obtained when the rotary disc rotation speed is increased three times and the tape running speed is increased six times.
Figure 10:
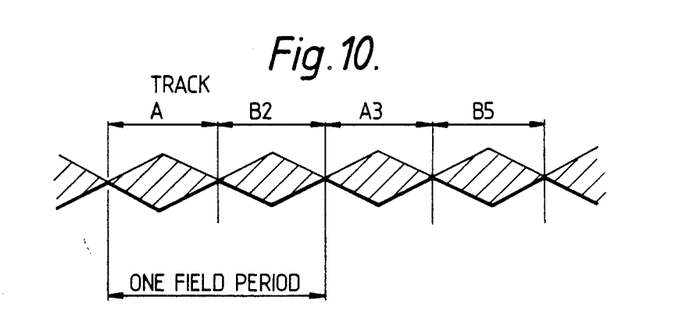
FIG. 10 is a graph showing the envelope of the playback signals obtained when the rotary disc rotation speed is increased two times and the tape running speed is increased six times.

In the embodiments described above, when the speed of the reverse playback is increased, the rotation of the rotary disc 21 becomes fast, the frequency of the playback composite video signal and the sampling frequencies become high, and the field memory 34 must adapt to the fast operation speed. Also, the rotation speed of the rotary disc 21 is increased so that the motor 22 for driving the rotary disc 21 and the power supply source must have specific performances. Several ways for meeting the requirements described above will now be described with reference to FIGS. 9 and 10, which are envelope diagrams of the playback composite video signals. As a first example, when the rotary disc 21 is driven at a speed of three times that of the normal playback mode in the reverse direction and the magnetic tape 23 is driven at a speed of six times that at the normal playback mode in the reverse direction, no noise burr is contained in the playback video image on the screen or the noise burr is shifted to an invisible portion on the screen. Next, as a second example, when the rotary disc 21 is driven at a speed of two times that of the normal playback mode in the reverse direction and the magnetic tape 23 is driven at a speed of six times that of the normal playback mode in the reverse direction, no noise burr is contained in the playback video image on the screen or the noise burr is shifted to an invisible portion on the screen. That is, when setting the rotation speed of the rotary disc 21 so that the frequency of the horizontal synchronous signal becomes three times the frequency of the normal playback mode (See FIG. 9) or two times the frequency (see FIG. 10) and that the speed ratio between the rotary disc rotation speed and the playback control pulse becomes 1:2 (FIG. 9) or 1:3 (FIG. 10), the position of the noise burr is fixed at the reduced level portion of the envelope. These modifications are performed by changing the six-time multiplier 38 to a three-time multiplier (FIG. 9) or a two-time multiplier (FIG. 10), respectively, and further changing the cut-off frequency of the low-pass filter 33 to ½ or ⅓. Then writing of the data in the memory elements 34A, 348 is carried out alternately at the cycle of the write sampling frequency WS-CK of three times the read sampling frequency RS-CK in the order of the track A2, A4, A8, A10. The stored data is read in the reverse direction at the read sampling frequency RS-CK (see FIG. 9), or at the cycle of the write sampling frequency WS-CK of two times the read sampling frequency RS-CK in the order of the track B2, B5, B8, B11. The stored data is read in the reverse direction at the read sampling frequency RS-CK (see FIG. 10). Then, the reverse playback with reduced noise can be performed.

In the manner described above, the field memory 34 may have a relatively slow operation speed. The rotation speed of the rotary disc drive motor 22 can be lowered. In addition, the present invention can be used for slow reverse playback. For example, a ¼ time slow reverse playback will now be described. When performing tracking control by setting the rotary disc speed and the capstan speed to ¼ the normal playback speeds but in the reverse direction, the composite video signal is played back with the time axis inverted at ¼ the frequency of the normal playback. In this case, the six-time multiplier 38 may be changed to a ¼ divider, and the cut-off frequency of the low-pass filter 33 may be changed to ¼. For example, the composite video signal on the track A1 is played back and sampled at ¼ the frequency of the read sampling clock RS-CK. The resulting signal is converted to a digital data in the A/D converter 32 and written into the memory element 34A in the period for tracing over four fields. Immediately after the writing, the stored data in the memory element 34A is repeatedly read out four times in the period for tracing over four fields in the reverse order relative to the write mode at the read sampling clock RS-CK.

Figure 11:
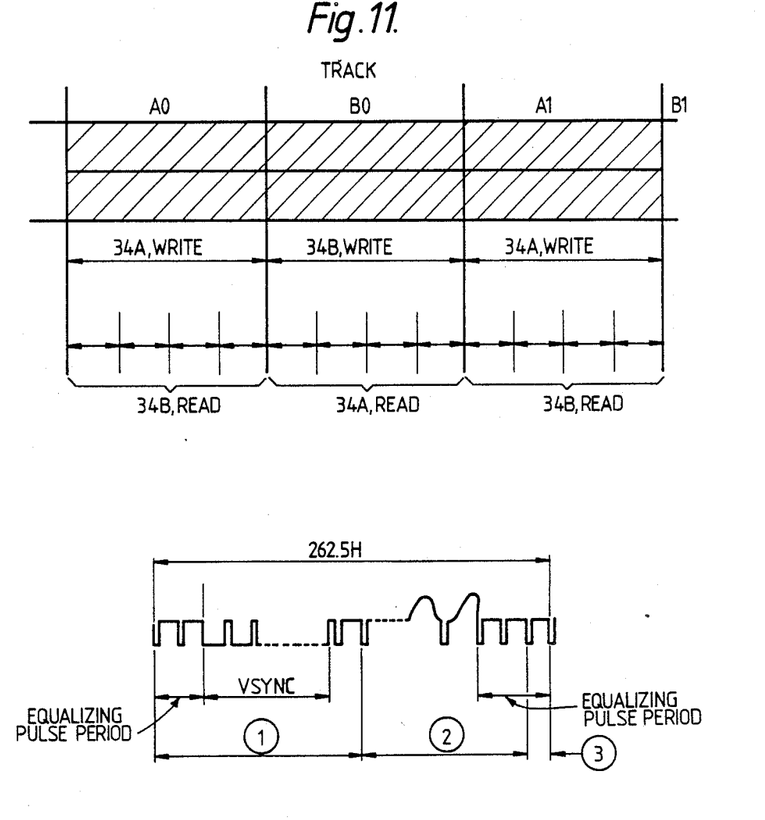
FIG. 11 is a graph showing the read/write timing of the memory obtained when performing a slow reproduction at a speed ¼ that of normal playback.
Figure 12:
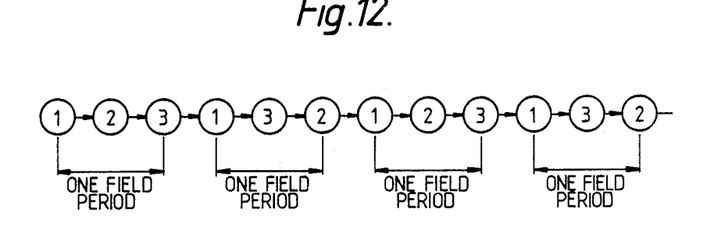
FIG. 12 is a graph for explaining the reading order of the memory when performing skew correction.

In the period of reading the memory element 34A, the composite video signal on the track A1 is played back and sampled at ¼ the frequency of the read sampling clock RS-CK, like the composite video signal on the track A1. The resulting signal is converted to digital data in the A/D converter 32 and written into the memory element 34B in the period for tracing over four fields. Immediately after the period for the reading the memory element 34A and the writing into the memory element 34B, the stored data in the memory element 34B is read out in the same manner as described above. During the period, the next digital data corresponding to the track B7 is written into the memory element 34A. FIG. 11 shows the read/write timing diagram for case. The composite video signal restored to the original analog signal in the D/A converter 39 has the same frequency as that of normal playback. Thus, the composite video signal from the D/A converter 39 is demodulated in a video signal by the playback signal processing circuit (not shown) in the television monitor. However, in this case also, the same field is repeatedly demodulated so that a skew arises for ½ the horizontal scanning period. To accommodate the skew, the reading of the data for one field with 262.5 H (H represents one horizontal scanning period) is controlled as shown in the timing diagram of FIG. 12. That is, an equalizing pulse (3) with a pulse width of ½ H on the trailing end of the field is alternatively read in succeeding the vertical synchronous pulses in the leading end (1) of the field or read in the normal order. According to the reading order, the horizontal synchronous signals in adjacent fields become continuous to each other and also the intervals of the horizontal synchronous signals in the adjacent fields becomes constant. Thus, the resultant video signal may be regularly interlaced.

The speed ratios a and b of the rotary disc speed and the capstan speed to the normal playback mode are not limited to integers. In this case, if a relation of $na=mb$ (n, m are integers) is established, the rotary disc speed and the capstan speed can be locked in phase. However, when $b/a>3$ or $b/a<1$, the noise burr appears in the visible area of the screen. Therefore, it is preferable that $b/a=1$ to 3.

Further, the speed ratio b takes a negative value in a fast or slow forward playback mode. In the case of the forward playback and when $a=-b$, it is possible to shift the noise burr to the upper portion and the lower portion of the screen. Even if the speed ratio b is negative, the noise burr may be decreased by increasing the speed ratio a.

In the description provided above, the A/D conversion and the writing are carried out for the composite video signal, but the A/D conversion and the writing can be carried out after demodulation of the composite signal to the video signal.

Also, memory devices such a DRAM (dynamic random access memory) are popular for the field memory 6, but it is possible to use a charge transfer device such as a CCD (charge coupled device).

The time axis of the played back composite video signals is inverted in the reverse playback. Accordingly, it is impossible to demodulate the played back composite video signals to the video signals in the same manner as the usual forward playback. That is, when FM signals are demodulated by the inverted time axis, the voltage proportional to the instantaneous frequency of FM signals are demodulated, and video signals where the time axis is inverted can been obtained. However, generally, the luminance signals Y are emphasized before the FM modulation at recording, and the luminance signals Y are de-emphasised after the FM demodulation at the playback. However, the signals which have been demodulated with the time axis inverted are not restored to the original luminance signals even if they are processed by the de-emphasis circuit. Also, the burst signal in the low frequency conversion color signal in which the time axis is inverted is positioned just before the horizontal synchronous signal. Therefore, the color signal is converted in signals of 3.58 MHz band by a gate pulse which is obtained in the burst signal position by delaying the horizontal synchronous signal separated in synchronous to the luminance signals Y. The color signal of the 3.58 MHz band is locked in phase with a reference signal after crosstalk is removed. As a result, the color signal in the reverse playback signal is restored to its time axis.

Figure 13:
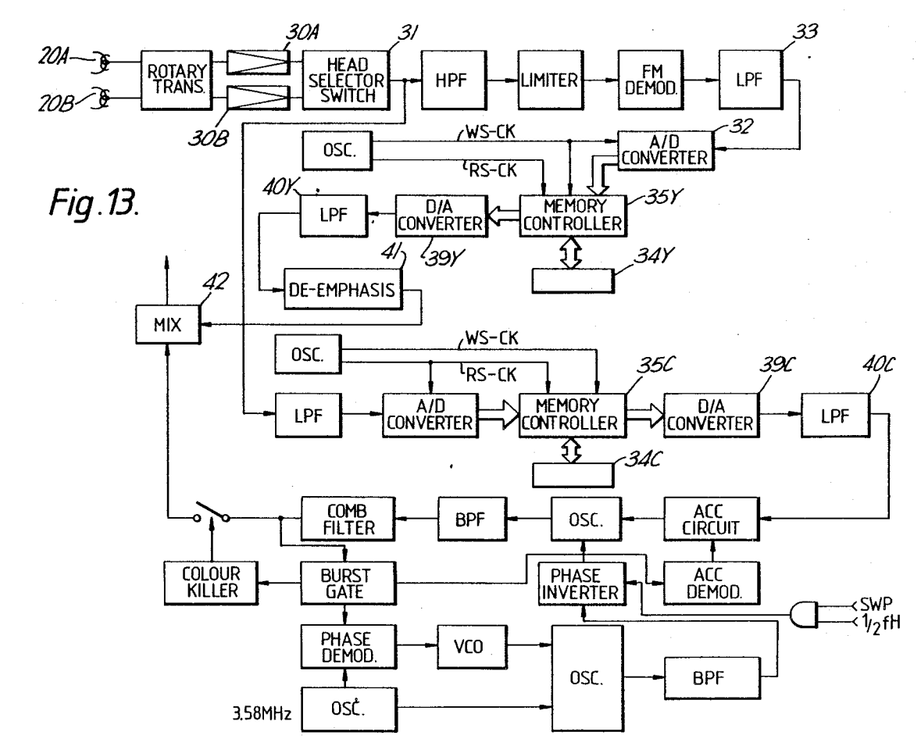
FIG. 13 is a block diagram showing a third embodiment of the present invention in which luminance signals Y are stored in one memory after being demodulated and color signals are converted to low frequencies and stored in another memory.

FIG. 13 shows another embodiment of the VTR including the reverse playback apparatus. As shown in FIG. 13, two memories 34Y and 34C and two corresponding memory controllers 35Y and 35C are provided for storing the luminance signal Y and the color signal C, respectively. The luminance signal Y and the color signal C are sampled by respective write sampling clocks which are two times or more the maximum frequency of their respective signal bands. The sampled levels of the luminance signal Y and the color signal C are converted to digital data in A/D converters 32 and then written into the memories 34Y and 34C. Stored digital data are read out from the memories 34Y and 34C by respective read sampling clocks which are 1/a of the write sampling clocks. The read digital luminance data is de-emphasised in the de-emphasis circuit 41, while the read digital color data C is converted in frequency. Then they are mixed together in the mixer 42 so that a regular video signal can be obtained. However, in this case, there is a problem in that the memories are required for the luminance signal Y and the color signal C, respectively.

Figure 14:
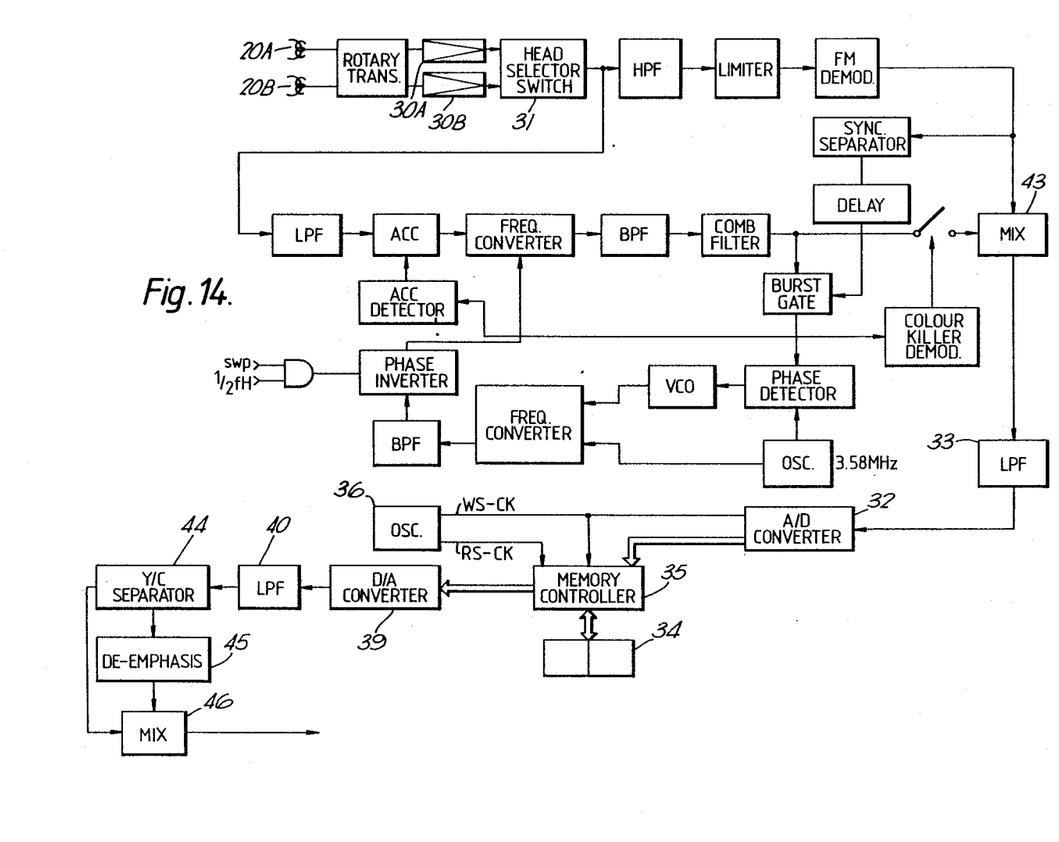
FIG. 14 is a block diagram showing a fourth embodiment of the present invention in which luminance signals Y are demodulated and color signals are restored to their original frequencies, and these signals are mixed and stored in one memory.

FIG. 14 shows still another embodiment of the VTR including the reverse playback apparatus. As shown in FIG. 14, the luminance signal Y and the color signal C are mixed together before digital processing. That is, the luminance signal Y is applied to a first mixer 43 after FM demodulation. The color signal C is applied to the first mixer 43 after frequency conversion. The mixed signal is then digitized in the A/D converter 32 and written into the memory 34. The stored data is read in the order reverse to that at writing. The read data is restored to an analog signal and separated in the luminance signal Y and the color signal C at a separation circuit 44. The luminance signal Y is then de-emphasized in a de-emphasis circuit 45. Then, again the de-emphasized luminance signal Y is mixed with the color signal C in a second mixer 46 so that the regular video signal can be obtained using relatively small memory capacity. In FIGS. 13 and 14, circuit elements without symbols are well known, and the description is omitted.

As described above, a magnetic reproducing apparatus according to the present invention is constituted so that when specific speed playback operations such as a fast forward playback, a fast reverse playback, a slow forward playback and a slow reverse playback other than the normal playback operation are carried out for playing back video signals recorded on a magnetic tape, a capstan drive motor is rotated in the forward or reverse direction at the rotation speed of b times that of the normal playback and also a rotary disc is rotated in forward or reverse direction at the rotation speed of a times that of the normal playback. The composite video signal obtained in the specific speed playback is sampled at a sampling frequency of the specified frequency associated with the rotation speed of the rotary disc and written into a memory. The stored data is read at another sampling frequency of 1/a times that the sampling frequency in the write mode, while the other signal is written into another memory. When $a=b$, the specific speed playback of the video signals can be carried out with reduced noise. Also, even when $a \neq b$, a video signal which is less affected by noise can be obtained by fixing a noise burr at a specified position. As a result, the specific speed playback of the video signal with less noise can be obtained.

What is claimed is:

1. A magnetic reproducing apparatus for reproducing signals prerecorded in defined tracks on a magnetic recording medium, said apparatus comprising:
    mode selection means for selecting between a normal mode and another mode;
    variable speed rotary head means for helically scanning the prerecorded signals on the recording medium to produce an output signal, said rotary head means rotating at a first speed during the normal mode;
    variable speed drive means for selectively moving the recording medium relative to said rotary head means, said drive means moving said recording medium at a second speed during the normal mode; and
    speed control means operatively coupled to and responsive to said mode selection means for controlling the speed of said rotary head means in correspondence with the speed of said drive means, said speed control means causing said rotary head means to rotate at a third speed equal to a predetermined rotary head constant times the first speed and causing said drive means to move said recording medium at a fourth speed equal to a predetermined drive constant times the second speed during the other mode, the rotary head constant and the drive constant having values other than zero and one and differing from one another;
    storage means operatively coupled to said rotary head means and including at least three storage elements for storing the output signal;
    clock means for generating a write clock signal and a read clock signal;
    storage control means operatively coupled to said storage means and to said clock means for sequentially writing selected portions of the output signal to each of said storage elements except a selected one of said storage elements at a first rate in accordance with the write clock signal during a first time period, for reading the selected portions of the output signal from the selected one of said storage elements at a second rate different from the first rate in accordance with the read clock signal during the first time period, and for sequentially reading the selected portions of the output signal from each of said storage elements except the selected one of said storage elements at the second rate in accordance with the read clock signal during a second time period different from the first time period, said storage control means sequentially selecting each of said storage elements as the selected one.

2. The apparatus of claim 1 wherein the variable speed drive means includes rotating capstan means for imparting a movement force to the recording medium.

3. The apparatus of claim 2 wherein the capstan means is bi-directional.

4. The apparatus of claim 1 wherein each of the rotary head constant and the drive constant is within the ranges of one to six and negative six to negative one.

5. The apparatus of claim 1 wherein the rotary head constant and the drive constant are selected so that noise burrs occur during portions of the output signal other than portions of the output signal corresponding to an image.

6. The apparatus of claim 1 wherein the rotary head constant and the drive constant are selected so that the absolute value of the ratio of the drive constant to the rotary head constant is in the range of approximately one to three.

7. A method for reducing noise during playback in a magnetic reproducing apparatus for reproducing signals prerecorded in defined tracks on a magnetic recording medium by cyclical helical scanning of the recording medium with a rotary head device to generate an output video signal, said method comprising the steps of:
    moving the magnetic recording medium at one of a normal playback speed and a fast speed relative to the rotary head;
    helically scanning the prerecorded signals in defined tracks on the magnetic recording medium with the rotary head to reproduce the output signal;
    setting the speed of the rotary head to be six times greater than the normal playback speed and to correspond with the speed of movement of the magnetic recording medium for reducing noise in the output signal;
    generating a write clock signal and a read clock signal;
    providing at least three storage elements;
    sequentially writing selected portions of the output signal to each of the storage elements except a selected one of said storage elements at a first rate in accordance with the write clock signal during a first time period;
    reading the selected portions of the output signal from the selected one of said storage elements at a second rate different from the first rate in accordance with the read clock signal during the first time period;
    sequentially reading the selected portions of the output signal from each of the storage elements except the selected one at the second rate in accordance with the read clock signal during a second time period different from the first time period; and
    sequentially selecting each of the storage elements as the selected one of said storage elements.

8. The method of claim 7 wherein the step of moving includes the step of moving the magnetic recording medium in one of two directions.

9. A method for reproducing signals prerecorded in defined tracks on a magnetic recording medium cyclically and helically scanned by a rotary head device during a mode other than a normal playback mode to produce an output signal, said method comprising the steps of:

adjusting the speed of movement of the magnetic recording medium relative to the rotary head device from a first speed used during the normal mode to a second speed equal to a predetermined drive constant times the first speed in response to selection of the other mode;

adjusting the speed of the rotary head device from a third speed used during the normal mode to a fourth speed equal to a predetermined rotary head constant times the third speed in response to selection of the other mode, the rotary head constant and the drive constant being other than zero and one and differing from one another;

generating a write clock signal and a read clock signal;

providing at least three storage elements;

sequentially writing selected portions of the output signal to each of the storage elements except a selected one of said storage elements at a first rate in accordance with the write clock signal during a first time period;

reading the selected portions of the output signal from the selected one of said storage elements at a second rate different from the first rate in accordance with the read clock signal during the first time period;

sequentially reading the selected portions of the output signal from each of the storage elements except the selected one at the second rate in accordance with the read clock signal during a second time period different from the first time period; and sequentially selecting each of the storage elements as the selected one of said storage elements.

10. The method of claim 9 wherein each of the rotary head constant and the drive constant is within the ranges of one to six and negative six to negative one.

11. The method of claim 9 wherein the rotary head constant and the drive constant are selected so that noise burrs occur during portions of the output signal other than portions of the output signal corresponding to an image.

12. The method of claim 9 wherein the rotary head constant and the drive constant are selected so that the absolute value of the ratio of the drive constant to the rotary head constant is in the range of approximately one to three.

* * * * *